United States Patent
Millott et al.

(10) Patent No.: US 7,197,147 B2
(45) Date of Patent: Mar. 27, 2007

(54) COMPUTATIONALLY EFFICIENT MEANS FOR OPTIMAL CONTROL WITH CONTROL CONSTRAINTS

(75) Inventors: Thomas A. Millott, Milford, CT (US); Douglas G. MacMartin, San Gabriel, CA (US); Robert K. Goodman, West Hartford, CT (US); James W. Fuller, Amston, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 828 days.

(21) Appl. No.: 10/083,774

(22) Filed: Feb. 27, 2002

(65) Prior Publication Data
US 2003/0002686 A1 Jan. 2, 2003

Related U.S. Application Data

(60) Provisional application No. 60/271,792, filed on Feb. 27, 2001.

(51) Int. Cl.
*G10K 11/16* (2006.01)
(52) U.S. Cl. ................... 381/71.8; 381/71.12; 244/1 N
(58) Field of Classification Search ............... 381/71.1, 381/71.12, 71.8, 71.4; 244/1 N
See application file for complete search history.

(56) References Cited

U.S. PATENT DOCUMENTS

| | | | |
|---|---|---|---|
| 5,347,586 A | 9/1994 | Hill et al. | |
| 5,365,594 A | 11/1994 | Ross et al. | |
| 5,386,472 A | 1/1995 | Pfaff et al. | |
| 5,526,292 A | 6/1996 | Hodgson et al. | |
| 5,558,298 A | 9/1996 | Pla et al. | |
| 5,627,896 A * | 5/1997 | Southward et al. | 381/71.11 |
| 5,940,519 A | 8/1999 | Kuo | |
| 6,002,778 A * | 12/1999 | Rossetti et al. | 381/71.4 |
| 6,094,601 A * | 7/2000 | Popovich | 700/28 |
| 6,138,947 A | 10/2000 | Welsh et al. | |

FOREIGN PATENT DOCUMENTS

EP 0773531 A2 5/1997

OTHER PUBLICATIONS

MacMartin, Douglas G., Davis, Mark W., Yoerkie, Jr., Charles A., Welsh, William A., Helicopter Gear-Mesh ANC Concept Demonstration, United Technologies Research Center, East Hartford, CT and Sikorsky Aircraft Corporation, Stratford, CT.

Millott, Thomas A., Welsh, William A., Yoerkie, Jr., Charles A., MacMartin, Douglas G., Davis, Mark W., Flight Test of Active Gear-Mesh Noise Control on the S-76 Aircraft, United Technologies Research Center, East Hartford, CT and Sikorsky Aircraft Corporation, Stratford, CT. Presented at the American Helicopter Society 54th Annual Forum, Washington, D.C., May 20-22, 1998, American Helicopter Society, Inc.

(Continued)

*Primary Examiner*—Brian T. Pendleton
(74) *Attorney, Agent, or Firm*—Carlson, Gaskey & Olds

(57) ABSTRACT

A system and method reduces undesired noise or vibration in a vehicle. The ambient vibration is measured and command signals are generated over time. The command signals are generated based upon the measured vibration and based upon a control weighting. By varying the control weighting over time, the maximum possible performance is always obtained subject to the saturation constraints.

26 Claims, 2 Drawing Sheets

OTHER PUBLICATIONS

Davis, Mark W., Refinement and Evaluation of Helicopter Real-Time Self-Adaptive Active Vibration Controller Algorithms, NASA Contractor Report 3821, Aug. 1984.
Douglas E. Melton, R.A. Greiner, Adaptive Feedforward Multiple-input, Multiple-Output Active Noise Control, 1992, pp. II-229-232.
Search Report PCT/US02/05922.
Search Report PCT/US02/05845.
U.S. Patent Application: Computationally Efficient Means for Optimal Control With Control Constraints, U.S. Appl. No. 10/085,037, filed Feb. 26, 2002.
U.S. Patent Application: "System for Computationally Efficient Adaptation of Active Control of Sound or Vibration", U.S. Appl. No. 10/084,254, filed Feb. 27, 2002.

U.S. Patent Application: "Adaptation Performance Improvements for Active Control of Sound or Vibration", U.S. Appl. No. 10/803,949, filed Feb. 27, 2002 now Patent No. 6,772,074, issued Aug. 3, 2004.
U.S. Continuation Application: "Adaptation Performance Improvements for Active Control of Sound or Vibration", U.S. Appl. No. 10/786,686, filed Feb. 25, 2004 now Patent No. 6,856,920, issued Feb. 15, 2005.
U.S. Patent Application: "System for Computationally Efficient Active Control of Tonal Sound or Vibration", U.S. Appl. No. 10/083,773, filed Feb. 27, 2002.

* cited by examiner

COMPUTATIONALLY EFFICIENT MEANS FOR OPTIMAL CONTROL WITH CONTROL CONSTRAINTS

This application claims priority to U.S. Provisional Application Ser. No. 60/271,792, Filed Feb. 27, 2001.

BACKGROUND OF THE INVENTION

1. Field of the Invention

This invention relates to optimal control of a system. More particularly, this invention relates to active vibration and active sound control systems for the interior of helicopters.

2. Background Art

Conventional active control systems consist of a number of sensors that measure the ambient variables of interest (e.g. sound or vibration), a number of actuators capable of generating an effect on these variables (e.g. by producing sound or vibration), and a computer which processes the information received from the sensors and sends commands to the actuators so as to reduce the amplitude of the sensor signals. The control algorithm is the scheme by which the decisions are made as to what commands to the actuators are appropriate.

A problem may arise in such a control scheme when the control decision yields a command that exceeds the physical capabilities of the system, for example, if the command to an actuator exceeds the actuator's physical limits.

SUMMARY OF THE INVENTION

The present invention utilizes a varying control weighting to provide improved performance while avoiding saturation of the actuators. For a least-squares or quadratic performance index, one typically includes a weighting on the control amplitudes to avoid actuator saturation. However, a constant weighting that is sufficient to ensure that no actuator ever saturates results in less than optimal performance. This invention therefore modifies the control weighting to ensure that the maximum possible performance is always obtained subject to the saturation constraints.

In the present invention, the ambient vibration is measured by a plurality of sensors. A plurality of command signals are generated over time based upon the measured vibration and based upon a control weighting. By varying the control weighting over time, the maximum possible performance is always obtained subject to the saturation constraints. The control weighting may be varied based upon the magnitude of the command signals.

DETAILED DESCRIPTION

Control systems consist of a number of sensors which measure ambient vibration (or sound), actuators capable of generating vibration at the sensor locations, and a computer which processes information received from the sensors and sends commands to the actuators which generate a vibration field to cancel ambient vibration (generated, for example by a disturbing force at the helicopter rotor). The control algorithm is the scheme by which the decisions are made as to what the appropriate commands to the actuators are.

Figure 1:
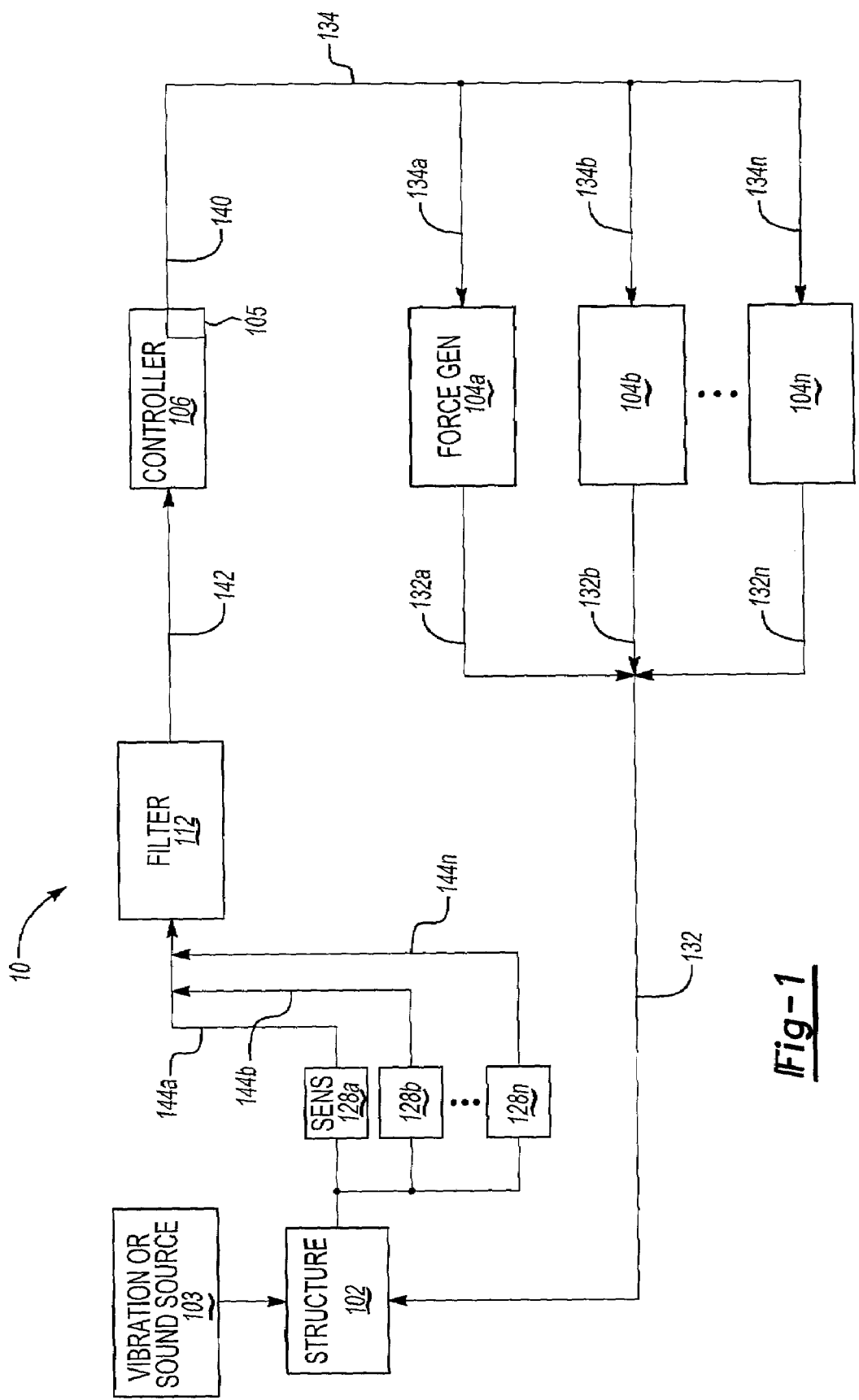
FIG. 1 shows a block diagram of the noise control system of the present invention.

FIG. 1 shows a block diagram 10 of an active control system. The system comprises a structure 102, the response of which is to be controlled, sensors 128, filter 112, control unit 106 and actuators (which could be force generators) 104. A disturbance source 103 produces undesired response of the structure 102. In a helicopter, for example, the undesired disturbances are typically due to vibratory aerodynamic loading of rotor blades, gear clash, or other source of vibrational noise. A plurality of sensors $128(a) \ldots (n)$ (where n is any suitable number) measure the ambient variables of interest (e.g. sound or vibration). The sensors (generally 128) are typically microphones or accelerometers, or virtually any suitable sensors. Sensors 128 generate an electrical signal that corresponds to sensed sound or vibration. The electrical signals are transmitted to filter 112 via an associated interconnector $144(a) \ldots (n)$ (generally 144). Interconnector 144 is typically wires or wireless transmission means, as known to those skilled in the art.

Filter 112 receives the sensed vibration signals from sensors 128 and performs filtering on the signals, eliminating information that is not relevant to vibration or sound control. The output from the filter 112 is transmitted to control unit 106 via interconnector 142 respectively. The control circuit 106 generates control signals that control force generators $104(a) \ldots (n)$.

A plurality of force generators $104(a) \ldots (n)$ (where n is any suitable number) are used to generate a force capable of affecting the sensed variables (e.g. by producing sound or vibration). Force generators $104(a) \ldots (n)$ (generally 104) are typically speakers, shakers, or virtually any suitable actuators. Force actuators 104 receive commands from the control unit 106 via interconnector 134 and output a force, as shown by lines $132(a) \ldots (n)$ to compensate for the sensed vibration or sound produced by vibration or sound source 103.

The control unit 106 is typically a processing module, such as a microprocessor, with processing capabilities. Control unit 106 stores control algorithms control memory 105, or other suitable memory location. Memory module 105 is, for example, RAM, ROM, DVD, CD, a hard drive, or other electronic, optical, magnetic, or any other computer readable medium onto which is stored the control algorithms described herein. The control algorithms are the scheme by which the decisions are made as to what commands to the actuators 104 are appropriate.

For a least-squares or quadratic performance index, one typically includes a weighting on the control amplitudes to avoid actuator saturation. However, a constant weighting that is sufficient to ensure that no actuator ever saturates results in less than optimal performance. This invention therefore modifies the control weighting to ensure that the maximum possible performance is always obtained subject to the saturation constraints. This is useful in the reduction of gear-mesh noise within a helicopter cabin.

For tonal control problems, the computation can be performed at an update rate lower than the sensor sampling rate as described in the copending application entitled "Computationally Efficient Means for Active Control of Tonal Sound or Vibration," which is commonly assigned. This approach involves demodulating the sensor signals so that the desired information is near DC (zero frequency), performing the control computation, and remodulating the control commands to obtain the desired output to the actuators. The control computations are therefore performed on the sine and cosine components at the frequency of interest for each sensor signal. These can be represented as a complex variable where the real part is equal to the cosine term, and the imaginary part is equal to the sine term. The same control algorithm can therefore be used for either low frequency disturbances or tonal disturbances, provided that complex notation is used. The approach will be described for such a demodulated tonal problem, but is equally applicable to low frequency disturbances.

The number of sensors is given by $n_s$ and the number of actuators $n_a$. The complex harmonic estimator variables that are calculated from the measurements of noise or vibration level can be assembled into a vector of length $n_s$ denoted $z_k$ at each sample time k. The control commands generated by the control algorithm can likewise be assembled into a vector of length $n_a$ denoted $u_k$. The commands sent to the actuators are generated by multiplying the real and imaginary parts of this vector by the cosine and sine of the desired frequency.

In the narrow bandwidth required for control about each tone, the transfer function between actuators and sensors is roughly constant, and thus, the system can be modeled as a single quasi-steady complex transfer function matrix, denoted T. This matrix of dimension $n_s$ by $n_a$ describes the relationship between a change in control command and the resulting change in the harmonic estimate of the sensor measurements, that is, $\Delta z_k = T \Delta u_k$. For notational simplicity, define $y_k = \Delta z_k$, and $v_k = \Delta u_k$. The complex values of the elements of T are determined by the physical characteristics of the system (including actuator dynamics, the structure and/or acoustic cavity, and anti-aliasing and reconstruction filters) so that $T_{ij}$ is the response at the reference frequency of sensor i due to a unit command at the reference frequency on actuator j. Many algorithms may be used for making control decisions based on this model.

The control law is derived to minimize a quadratic performance index $$J = z^H W_z z + u^H W_u u + v^H W_{\delta u} v$$

where $W_z$, $W_u$ and $W_{\delta u}$ are weighting matrices that are typically diagonal on the sensors, control inputs, and rate of change of control inputs respectively. A larger control weighting on an actuator will result in a control solution with smaller amplitude for that actuator.

Solving for the control which minimizes J yields:

$$u_{k+1} = u_k - Y_k(W_u u_k + T_k^H W_z z_k)$$

where $$Y_k = (T_k^H W_z T_k + W_u + W_{\delta u})^{-1}$$

Solving for the steady state control ($u_{k+1} = u_k$) yields $$u = -(T^H W_z T + W_u)^{-1} T^H W_z z_0$$

The matrix Y determines the rate of convergence of different directions in the control space, but does not affect the steady state solution. In the following equation, the step size multiplier $\beta < 1$ provides control over the convergence rate of the algorithm. A value of approximately $\beta = 0.1$ may be used, for example.

$$u_{k+1} = u_k - \beta Y_k(W_u u_k + T_k^H W_z z_k)$$

This equation corresponds to a recursive least-squares (RLS) control law. A least mean square (LMS) gradient approach could also be used, leading to a similar equation for $u_{k+1}$ but with Y=I instead. For poorly conditioned T matrices, the equalization of convergence rates for different directions that is obtained with the RLS approach is critical.

Decreasing the control weighting, $W_u$, increases the low frequency gain, and decreasing the weighting on the rate of change of control, $W_{\delta u}$, increases the loop cross-over frequency (where frequency refers to the demodulated frequency). The notation $(u_i)_k$ will be used to refer to the (demodulated) command to the $i^{th}$ actuator at the $k^{th}$ control iteration.

The command to any actuator may not exceed some (typically) fixed value $U_{max}$, depending on the range of the D/A (digital to analog converter), amplifier limits, or actuation limits. This maximum value may be different for different actuators. If the desired command to an actuator $(u_i)_k$ as determined by the equations above exceeds the maximum allowable for that actuator by the ratio $R = |(u_i)_k|/U_{max}$, then typically either that one particular actuator command is scaled by 1/R, or the entire vector is scaled by 1/R. In many applications the latter yields better results. For example, with two force actuators that combine to produce a force and a moment, it is preferable to reduce both actuator commands rather than just the saturated actuator, so that a significant change in the desired moment is not introduced. However, either of these two approaches can lead to a significant loss in performance.

Typically, the control weighting values are fixed to a predefined value (based on experience), and are sometimes scheduled versus operating condition. However, in some applications such as using the active noise/vibration control algorithm to minimize helicopter noise and/or vibration, it is very difficult to predetermine control weighting values that provide optimal performance over the entire flight envelope. Fixing the control weighting to prevent actuator saturation in the worst case condition will, in general, result in sub-optimal performance over the remainder of the flight envelope. Furthermore, the value of control weighting which results in optimal performance on one day may not yield the same performance on a different day, or even later during the same flight (e.g., due to weight, temperature, or humidity changes). Based on the above discussion, it would be desirable to be able to actively vary the control weighting values to attempt to find the optimal values for the current operating condition.

One aspect of the present invention is to introduce a time-varying control weighting. Another aspect is to improve the re-scaling of the actuator commands in the event of actuator saturation.

Variable Weighting

The approach used to achieve a time-varying control weighting in the noise and vibration control algorithm, denoted as variable control weighting, is as follows. When the code is initialized, the control weightings are set to some initial conservative values. As the control feedback loop converges to a steady state solution, the algorithm slowly varies the control weighting on a channel-by-channel basis until optimal performance is achieved. As discussed herein, "optimal performance" is defined as achieving the greatest reduction in the magnitude of the sensor signals z without saturating any of the actuator channels. In the variable control weighting approach, values of the actuator commands are used to actively adjust the control weighting values to maximize the reductions in the sensor signals while avoiding saturating any of the actuators. In a steady-state condition, the variable control weighting approach actively seeks for each actuator channel the smallest value of control weighting required to prevent saturation. However, recognizing the fact that a helicopter in flight is never truly in a steady-state condition, the variable control weighting approach actively increases the value of the control weighting for any actuator channel that saturates.

The approach used in the noise and vibration control algorithm is to introduce various threshold levels, and multiply the control weighting $(W_{u,i})_k$ for each actuator i at each time step k by a scalar based on the magnitude of the control command $(u_i)_k$ computed for that actuator. A table look-up was used for the reduction to practice in helicopter gearmesh control, however, a continuous function could also have been used. An example is given by the table below.

| Magnitude of command | Scale control weight by |
|---|---|
| $0 < |(u_i)_k| < .5 * u_{max}$ | $(W_{u,i})_{k+1} = 0.999 * (W_{u,i})_k$ |
| $.5 * u_{max} < |(u_i)_k| < .8 * u_{max}$ | $(W_{u,i})_{k+1} = 1.0 * (W_{u,i})_k$ |
| $.8 * u_{max} < |(u_i)_k| < .9 * u_{max}$ | $(W_{u,i})_{k+1} = 1.08 * (W_{u,i})_k$ |
| $.9 * u_{max} < |(u_i)_k| < 1.0 * u_{max}$ | $(W_{u,1})_{k+1} = 1.20 * (W_{u,i})_k$ |
| $1.0 * u_{max} < |(u_i)_k|$ | $(W_{u,i})_{k+1} = 1.56 * (W_{u,i})_k$ |

The actual numbers used would differ for each specific application and would depend upon many different factors, including the update rate and the control bandwidth. Similarly, in some applications, the performance metric of interest is not the rms of all sensors, but rather the worst case. For example, with vibration control on a helicopter, the objective is to keep the vibration levels at all locations below some specified level. The weighting matrix $W_z$ is used to place differential weighting on various sensors in which it is desired to produce reductions. In the case where there are specific maximum allowable sensor signal magnitudes to satisfy some predefined specification, such as a maximum vibration level in the case of AVC, the relative values of the elements of $W_z$ can be actively adjusted such that all sensors are below their maximum allowable values. The relative values in the (typically diagonal) $W_z$ matrix are adjusted such that the trace of the matrix remains unchanged but the element corresponding to the sensor which is above the desired specification is increased. This is done iteratively until all are below the desired specification.

Actuator Scaling

Conventional approaches to re-scaling the actuator command to avoid saturation result in less than optimal performance. The ideal approach is to modify the control weighting for the actuators (one or more) with the unallowable commands so that the new commands for those actuators are exactly at the limits. The invention described here accomplishes this ideal.

The nominal updated control step is given by $$u_{k+1} = u_k - \beta (T_k^H W_z T_k + W_u + W_{\delta u})^{-1}(W_u u_k + T_k^H W_z z_k)$$

If the $i^{th}$ actuator command computed from this equation exceeds the allowable command $u_{max}$ (which may be different for different actuators), then a modified control step $\mu_{k+1}$ that satisfies $|\mu(i)_{k+1}| = u_{max}$ can be computed in a computationally efficient manner from $\mu_{k+1}$ by substituting a new control weighting given by $W_u + \alpha e_i e_i^T$ into the control update equation. The notation $u(i)_k$ indicates the $i^{th}$ element of the vector a at time step k. The vector $e_i$ denotes a vector with all zero entries except for unity in the $i^{th}$ entry, so that the new control weighting matrix differs from the original matrix only in the $i^{th}$ diagonal entry. If there are multiple actuators at saturation (L>1), then additional terms are added to $W_u$.

Solving for $\mu_{k+1}$ for each actuator channel j yields $$\mu(j)_{k+1} = u(j)_{k+1} - Y(j,i)\alpha(\mu(i)_{k+1} - (1-\beta)u(i)_k)$$

The scalar Y(j,i) refers to the $(j,i)^{th}$ element of the matrix Y defined earlier. For L>1, the same equation holds with $\alpha$ being a real diagonal matrix of additional control weights, i representing a vector of indices corresponding to the saturated actuators, and Y(j,i) a 1×L vector. From this equation, then given $\alpha$, $\mu(i)_{k+1}$ can be computed. From this, the remaining elements of $\mu_{k+1}$ can be computed. The additional L control weightings on the $i^{th}$ channels, $\alpha$, and the L complex variables $\mu(j)_{k+1}$ are the solution of the L complex equations above along with the L real constraint equations that $|\mu(i)_{k+1}| = u_{max}$. This can be solved in a variety of methods.

In the case of a single unallowable command, $\alpha$ is the solution to the following scalar quadratic equation where y=Y(i,i):

$$a(\alpha y)^2 + 2b(\alpha y) + c = 0$$

where $$a = (1-\beta)^2 |u(i)_k|^2 - u_{max}^2$$

$$b = (1-\beta)[u(i)_{k+1} u(i)_k + i(i)_k * u(i)_{k+1}]/2 - u_{max}^2$$

$$c = |u(i)_{k+1}|^2 - u_{max}^2$$

Note a <0, since the command at $k^{th}$ step can't exceed saturation and c>0, since by presumption the command exceeds saturation. Therefore, regardless of the sign of b, there is a unique, real, positive solution $\alpha$ corresponding to the control weight for which the actuator with the nominal command above saturation would instead be exactly at saturation. If the new actuator command vector includes any actuators that exceed saturation, the approach can be applied again in an iterative fashion. However, there is no guarantee that this process will converge. Therefore, since most of the benefit will accrue from the first or second use of this approach, the best compromise is to return to a simpler scaling of the command vector at some point if there are remaining actuator commands exceeding saturation. As an aside, also note that repeating the process for a second actuator would require re-computing the matrix Y with the new control weighting from the first iteration. A similar approach to that described here could be derived where several actuators were considered simultaneously; this would result in a set of coupled equations for the new control weightings.

The scaling formulation described herein can be used in conjunction with the previously described variable control weighting approach. The final line of the table given in the variable control weighting section is modified to use the updated control weighting based on $\alpha$. This approach results in optimal performance in the presence of actuator saturations. Without this additional modification, the variable control weighting described earlier will eventually converge to the optimal performance solution, however, the convergence maybe poor. Note that if none of the actuators saturate in any conditions, then the actuators have more authority than they need. Hence, if the actuators must be designed so as to never saturate in order to ensure good performance, then the overall cost and weight of the system will be excessive.

An alternate approach to scaling the control commands if one of them exceeds the saturation value is also possible. This alternate approach results in performance that is close to the optimal solution described above, although it constrains the control command for the saturated actuator more than is necessary. This approach involves scaling back the single command, computing the residual noise introduced by doing so, and computing an additional Δu for the remaining actuators to cancel this residual noise. This last step uses a large control rate weighting on the saturated actuator so that the additional Δu for that actuator is zero.

With the first approach (suggested above), the appropriate control weight for that actuator is computed and can be used in the next step. Also, for large $n_a$, the computations required for the approach described below are substantially more than those required for the first approach. However, the second approach is guaranteed to converge if there are multiple actuator saturations. Therefore, the most appropriate algorithm for a particular application depends on the number of actuators, the computation available, and the extent to which multiple actuators are frequently operating at their saturation limits. The second approach, described below, is described in more detail and claimed in copending U.S. Pat. No. 7,107,127, filed Feb. 26, 2002, and also claims priority to U.S. Ser. No. 60/271,792.

Actuator Truncation Scheme

This approach to limiting the actuator commands guarantees convergence in $n_a$ or less steps to a set of actuator commands which are at or below saturation. A nominal updated control step is given by:

$$u_{k+1} = u_k - \beta(T_k^H W_z T_k + W_u + W_{\delta u})^{-1}(W_u u_k + T_k^H W_z z_k)$$

If the $i^{th}$ actuator command computed from this equation exceeds the allowable command $u_{max}$ (which may be different for different actuators), then a modified control update $\mu_{k+1}$ that satisfies $|(i)_{k+1}|=u_{max}$ is computed from $u_{k+1}$ by scaling $u(i)_{k+1}$ by the ratio $u_{max}/|u(i)_{k+1}|$ while all other elements of $u_{k+1}$ are held fixed. Then a revised control update $u^*_{k+1}$ is computed from the following control update equation:

$$u^*_{k+1} = \mu_{k+1} - (T_k^H W_z T_k + W^*_{\delta u} + \gamma e_i e_i^T)^{-1}(T_k^H W_z T_k(\mu_{k+1} - u_{k+1}))$$

with $$W^*_{\delta u} = W_{\delta u} + \gamma e_i e_i^T$$

where γ is "a large number" (i.e., on the order of $10^6$ times larger than the magnitude of a typical element of $W_{\delta u}$.) The vector $e_i$ denotes a vector with all zero entries except for unity in the $i^{th}$ entry, so that the new control rate weighting matrix differs from the original matrix only in the $i^{th}$ diagonal entry. The addition of the term $\gamma e_i e_i^T$ to the $i^{th}$ element of the control rate weighting matrix $W_{\delta u}$ prevents the $i^{th}$ element of $\mu_{k+1}$ from being altered by the above control update equation, i.e. it is guaranteed that $u^*(i)_{k+1} = \mu(i)_{k+1}$ The above procedure is repeated iteratively for each saturated channel (one channel at a time) until no elements of the control update exceed their respective saturation values. This iterative procedure is guaranteed to converge in no more than $n_a$ steps since once an actuator channel has reached saturation, that channel's command is held fixed at saturation until the next control update cycle. Once this procedure has been completed, then $u_{k+1} = u^*_{k+1}$ is defined as the control update for the current cycle.

Figure 2:
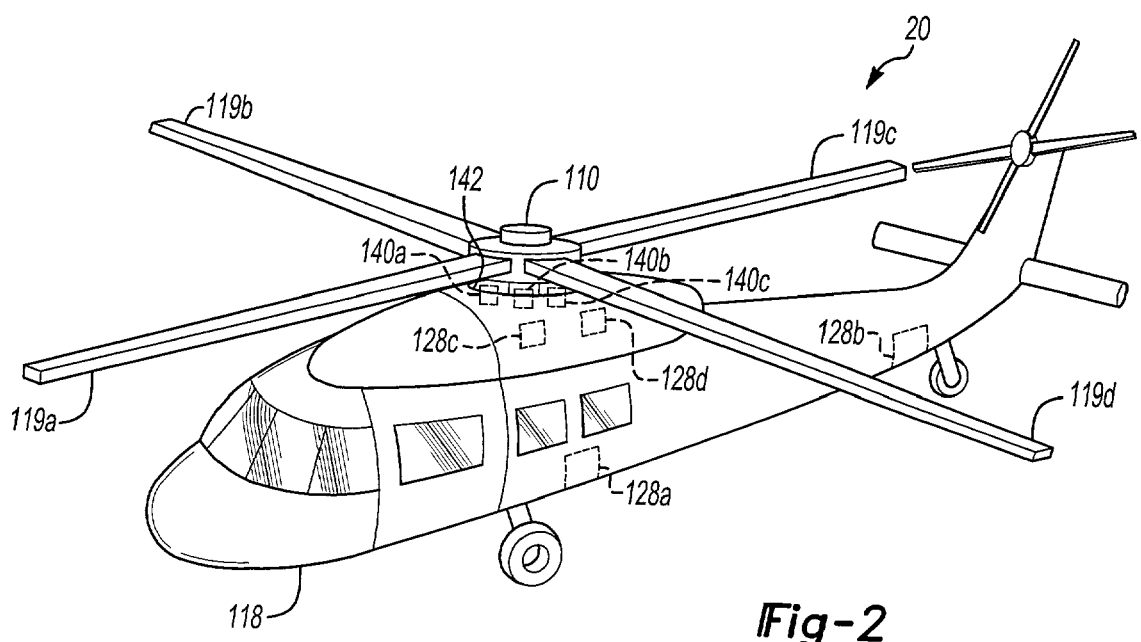
FIG. 2 shows a vehicle in which the present invention may be used.

FIG. 2 shows a perspective view 20 of a vehicle 118 in which the present invention can be used. Vehicle 118, which is typically a helicopter, has rotor blades 119(a) . . . (d). Gearbox housing 110 is mounted at an upper portion of vehicle 118. Gearbox mounting feet 140(a) . . . (c) (generally 140) provide a mechanism for affixing gearbox housing 110 to vehicle airframe 142. Sensors 128(a) through (d) (generally 128) are used to sense acoustic vibration produced by the vehicle, which can be from the rotorblades 119 or the gearbox housing 110. Although only four sensors are shown, there are typically any suitable number of sensors necessary to provide sufficient feedback to the controller (not shown). The sensors 128 maybe mounted in the vehicle cabin, on the gearbox mounting feet 140, or to the airframe 142, or to another location on the vehicle 118 that enables vehicle vibrations or acoustic noise to be sensed. Sensors 128 are typically microphones, accelerometers or other sensing devices that are capable of sensing vibration produced by gear clash from the gearbox 110 and generating a signal as a function of the sensed vibration. These sensors generate electrical signals (voltages) that are proportional to the local noise or vibration.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Note that alphanumeric labels on method steps are for clarifying references in dependent claims and unless otherwise specified do not require a specific sequence in which the steps are to be performed.

What is claimed is:

1. A method for actively controlling a physical variable of interest including the steps of:
   a. measuring the physical variable;
   b. generating a plurality of command signals over time, each of the plurality of command signals including at least one command signal component associated with each of a plurality of force generators wherein the plurality of command signal components are calculated based upon said physical variable measured in said step a and based upon a control weighting, the control weighting including a plurality of control weighting components, each said control weighting component associated with one of the plurality of command signal components;
   c. varying the control weighting over time, including varying at least one of the plurality of control weighting components relative to another one of the plurality of control weighting components based upon a magnitude of the plurality of command signal components; and
   d. activating the plurality of force generators based upon said plurality of command signals.

2. The method of claim 1 wherein said step c. further includes the step of varying more than one of said control weighting components.

3. The method of claim 2 further including the step of varying each of the control weighting components based upon a magnitude of the associated command signal component.

4. The method of claim 1 wherein said step c. further includes the step of varying each of the control weighting components based upon a magnitude of its associated command signal component.

5. The method of claim 4 wherein the plurality of control weighting components include a first control weighting component greater than a second control weighting component.

6. The method of claim 1 wherein the plurality of command signal components are calculated in said step b. by minimizing a performance index in which the control weighting components are weights on the command signal components, the performance index further including the physical variable measured in said step a.

7. A method for actively controlling a physical variable of interest including the steps of:
   a. measuring the physical variable with a plurality of sensors;
   b. generating a plurality of command signals over time based upon said physical variable measured in said step a and based upon a control weighting;
   c. varying the control weighting over time; and
   d. minimizing a performance index $J=z^H W_z Z + u^H W_u u + v^H W_{\delta u} v$, where $W_z$, $W_u$ and $W_{\delta u}$ are matrices for the control weighting on sensors z, control inputs u, and rate of change of control inputs v, respectively.

8. The method of claim 7 wherein the control weighting $W_u$ is varied over time in said step c.

9. The method of claim 8 wherein the control weighting $W_u$ comprises a plurality of control weighting components, each associated with one of a plurality of components of each of the plurality of command signals, the method further including the step of scaling each of the control weighting components based upon a magnitude of the associated command signals component.

10. The method of claim 7 wherein the control weighting $W_z$ is varied over time in said step c.

11. A method for reducing sensed physical variables including the steps of:
   a. generating a plurality of sensed signals based upon physical variables;
   b. calculating a plurality of control commands as a function of the sensed signals;
   c. comparing each of the plurality of control commands to at least one maximum;
   d. reducing at least one of the plurality of control commands to a reduced control command based upon said step c.;
   e. recalculating the plurality of control commands other than the reduced control command based upon the reduced control command.

12. The method of claim 11 wherein the plurality of control commands are calculated in said steps b. and e. to minimize a performance metric that includes a sensed weighting on the plurality of sensed signals and a control weighting on the plurality of control commands.

13. The method of claim 12 wherein the performance metric further includes a weighting on a change in control command over time.

14. The method of claim 12 further including the steps of:
   f. computing the difference between the at least one control command and the reduced control command;
   g. estimating a difference in the sensed signals based upon the difference; and
   h. recalculating in said step e. based upon said difference in the sensed signals.

15. A system for controlling a physical variable comprising:
   a plurality of sensors for measuring the physical variable;
   a control unit generating a plurality of command signals over time, the plurality of command signals each including a plurality of command signal components, the control unit programed to calculate the command signal components based upon the physical variable measured by the plurality of sensors and based upon a control weighting that varies over time, the control weighting including a plurality of control weighting components, each said control weighting component associated with one of the plurality of command signal components, the control unit varying the control weighting components relative to one another based upon a magnitude of at least one of the plurality of command signals; and
   a plurality of force generators each activated based upon an associated one of said plurality of command signal components.

16. The system of claim 15 wherein the control unit varies selected ones of the control weighting components individually based upon a magnitude of the associated command signal components.

17. The system of claim 16 wherein the control weighting components include a first control weighting component greater than a second control weighting component.

18. A computer readable medium storing a computer program, which when executed by a computer performs the steps of:
   a. generating a first command signal based upon a measured physical variable and a control weighting, the first command signal including a plurality of command signal components, the control weighting including a plurality of control weighting components, each said control weighting component associated with one of the plurality of command signal components;
   b. changing the control weighting over time after said step a. based upon a magnitude of the first command signal, including changing one of the control weighting components relative to another one of the control weighting components based upon their associated command signal components; and
   c. generating a second command signal based upon the control weighting after said step b.

19. The computer readable medium of claim 18, wherein each command signal component is associated with each of a plurality of force generators, and wherein said step b. further includes the step of varying the command signal component for each of the force generators sequentially.

20. The computer readable medium of claim 19, wherein said step b. further includes the step of varying the control weighting based upon a magnitude of at least one of the command signal components.

21. The computer readable medium of claim 18, wherein said step c. further includes the step of varying each of the control weighting components based upon a magnitude of the associated command signal component.

22. The computer readable medium of claim 21 wherein the control weighting components include a first control weighting component greater than a second control weighting component.

23. A computer readable medium storing a computer program, which when executed by a computer performs the steps of:
   a. generating a first command signal based upon a measured physical variable and a control weighting;
   b. changing the control weighting over time after said step a.;
   c. generating a second command signal based upon the control weighting after said step b, wherein the first command signal and second command signal each include at least one command signal component associated with each of a plurality of force generators, and wherein said step b. further includes the step of varying the at least one command signal component for each of the force generators sequentially.

24. The method of claim 11 wherein said step e) is performed based upon the function and based upon the reduced control command.

25. The method of claim 8 wherein the control weighting $W_u$ comprises a plurality of control weighting components associated with a plurality of command signal components of at least one of the plurality of command signals, the method further including the step of sealing each of the control weighting components based upon a magnitude of the associated command signal components.

26. The system of claim 15 wherein the control unit varies each of the control weighting components based upon a magnitude of the associated command signal components.

* * * * *

UNITED STATES PATENT AND TRADEMARK OFFICE
CERTIFICATE OF CORRECTION

PATENT NO. : 7,197,147 B2  Page 1 of 1
APPLICATION NO. : 10/083774
DATED : March 27, 2007
INVENTOR(S) : Millott et al.

It is certified that error appears in the above-identified patent and that said Letters Patent is hereby corrected as shown below:

Claim 14, Column 9, line 47: "12" should be --11--

Claim 25, Column 11, line 5: "sealing" should be --scaling--

Signed and Sealed this

Twenty-second Day of May, 2007

JON W. DUDAS
*Director of the United States Patent and Trademark Office*